(12) United States Patent
Lee (10) Patent No.: US 11,231,723 B2
(45) Date of Patent: Jan. 25, 2022

(54) METHOD FOR HANDLING BRAKE FAILURE OF AUTONOMOUS VEHICLE AND DEVICE AND SYSTEM THEREFOR

(71) Applicants: Hyundai Motor Company, Seoul (KR); Kia Motors Corporation, Seoul (KR)

(72) Inventor: Jong Ho Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 30 days.

(21) Appl. No.: 16/836,167

(22) Filed: Mar. 31, 2020

(65) Prior Publication Data

US 2021/0181760 A1 Jun. 17, 2021

(30) Foreign Application Priority Data

Dec. 13, 2019 (KR) .......................... 10-2019-0166312

(51) Int. Cl.
  *G05D 1/02* (2020.01)
  *B60W 30/085* (2012.01)
  *B60W 10/20* (2006.01)
  *B60W 40/12* (2012.01)

(52) U.S. Cl.
  CPC ........... *G05D 1/0287* (2013.01); *B60W 10/20* (2013.01); *B60W 30/085* (2013.01); *B60W 40/12* (2013.01); *B60W 2510/18* (2013.01); *B60W 2554/80* (2020.02); *B60W 2720/10* (2013.01)

(58) Field of Classification Search
  None
  See application file for complete search history.

(56) References Cited

U.S. PATENT DOCUMENTS

| | | | |
|---|---|---|---|
| 2016/0071418 A1* | 3/2016 | Oshida | B60W 30/165 701/23 |
| 2018/0072312 A1* | 3/2018 | Park | B60W 10/18 |
| 2019/0168724 A1 | 6/2019 | VandenBerg, III et al. | |
| 2020/0098253 A1* | 3/2020 | Zeplin | G08G 1/005 |
| 2020/0236521 A1* | 7/2020 | Vassilovski | G08B 25/016 |
| 2020/0361428 A1* | 11/2020 | Blumentritt | B60T 17/221 |
| 2020/0396782 A1* | 12/2020 | Russell | H04L 67/12 |

* cited by examiner

*Primary Examiner* — David P. Merlino
(74) *Attorney, Agent, or Firm* — Mintz Levin Cohn Ferris Glovsky and Popeo, P.C.; Peter F. Corless (57) ABSTRACT

An autonomous vehicle brake failure handling method is provided. The method includes detecting a brake system failure of the autonomous vehicle and transmitting a rescue request signal to a control server when the failure is detected. A bumper of the autonomous vehicle is moved into contact with a preceding autonomous vehicle bumper or the autonomous vehicle is docked with the preceding autonomous vehicle through speed control and steering control. The autonomous vehicle having the failure-detected brake system is completely braked under deceleration control of the preceding autonomous vehicle when the autonomous vehicle bumper and the preceding autonomous vehicle bumper are in contact with each other or when the docking of the autonomous vehicle and the preceding autonomous vehicle has been completed.

20 Claims, 8 Drawing Sheets

Fig.8

METHOD FOR HANDLING BRAKE FAILURE OF AUTONOMOUS VEHICLE AND DEVICE AND SYSTEM THEREFOR

CROSS-REFERENCE TO RELATED APPLICATION

This application claims the benefit of priority to Korean Patent Application No. 10-2019-0166312, filed on Dec. 13, 2019, the entire contents of which are incorporated herein by reference.

TECHNICAL FIELD

The present disclosure relates to an autonomous vehicle, and more particularly, to a technology of performing cooperative control with an adjacent autonomous vehicle through an autonomous driving control server in response to detecting a failure of an autonomous vehicle brake system to safely stop a failed autonomous vehicle.

BACKGROUND

Recently, automotive companies as well as companies in various fields are promoting a development of an autonomous vehicle. However, there are still safety issues for the autonomous vehicle. For example, safety issue include lack of reliability within lane and obstacle recognition using an infrared camera, a Time of Flight (TOF) camera, a radar, a LIDAR, and the like, but also a higher reliability of a brake system and a steering system that are directly connected to safety is required.

In particular, an importance of redundancy is emerging as a technical complement to a vehicle brake system. The brake system of the autonomous vehicle is an important chassis system directly connected to the overall safety of the vehicle. The redundancy of the brake system is a redundant system that automatically operates a secondary brake system when a primary brake system has failed. However, there is a possibility of malfunction or non-operation even when the secondary brake system is switched over based on the failure of the primary brake system. Therefore, a system that, when all brake systems of the autonomous vehicle have failed, urgently brakes the autonomous vehicle is required.

SUMMARY

The present disclosure provides a method for handling a brake failure of an autonomous vehicle, and a device and a system therefor. Another aspect of the present disclosure provides a method for handling a brake failure of an autonomous vehicle, and a device and a system therefor that may perform cooperative control with an adjacent autonomous vehicle via an autonomous driving control server in response to detecting a failure of a brake system of the autonomous vehicle, thereby safely stopping a failed autonomous vehicle. Another aspect of the present disclosure provides a method for handling a brake failure of an autonomous vehicle, and a device and a system therefor in which all of redundant braking systems may be completely braked by an adjacent preceding autonomous vehicle to which a failed autonomous vehicle is communicatively connected.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a method for handling a brake failure of an autonomous vehicle may include detecting a failure of a brake system of the autonomous vehicle, transmitting a rescue request signal to a control server when the failure is detected, and operating the vehicle to bring a bumper of the autonomous vehicle into contact with a bumper of a preceding autonomous vehicle or docking the autonomous vehicle with the preceding autonomous vehicle through speed control and steering control under operation of the control server. The autonomous vehicle having the failure-detected brake system may be completely braked under deceleration control of the preceding autonomous vehicle when the bumpers of the autonomous vehicle and the preceding autonomous vehicle are in contact with each other or when the docking of the autonomous vehicle and the preceding autonomous vehicle has been completed.

In one exemplary embodiment, the brake system may include a primary brake system and a secondary brake system automatically driven when the primary brake system has failed. The detecting of the failure of the brake system may include detecting the failure of the primary brake system while the vehicle is being driven, and detecting a failure of the secondary brake system when the failure of the primary brake system is detected. The brake system may be determined to have failed when both the primary brake system and the secondary brake system have failed.

The control server may be configured to obtain position information regarding the autonomous vehicle having the failed brake system based on the rescue request signal, and select the preceding autonomous vehicle based on the obtained position information. Additionally, the control server may be configured to operate remaining vehicles other than the selected preceding autonomous vehicle to not travel in a traveling lane of the autonomous vehicle having the failed brake system.

The control server may be configured to perform the speed control and the steering control when an acceptance response to a rescue operation request transmitted to the selected preceding autonomous vehicle is received. The speed control and the steering control may be performed for at least one of the preceding autonomous vehicle and the autonomous vehicle having the failed brake system.

In one exemplary embodiment, traveling lanes of the preceding autonomous vehicle and the autonomous vehicle having the failed brake system may be matched with each other through the steering control, and then the speed control may be performed to bring a rear bumper of the preceding autonomous vehicle into contact with a front bumper of the autonomous vehicle having the failed brake system. The method may further include transmitting a rescue completion signal to the control server in response to detecting the complete brake.

According to another aspect of the present disclosure, a brake failure handling system for an autonomous vehicle may include a first autonomous vehicle configured to transmit a rescue request signal in response to detecting a failure of a brake system while the vehicle is being driven, and a control server configured to select and operate a second autonomous vehicle for completely braking the first autonomous vehicle based on the rescue request signal. The control server may be configured to execute a speed control of the vehicles to bring a bumper of the first autonomous vehicle into contact with a bumper of the second autonomous vehicle or may be configured to dock the first autonomous vehicle with the second autonomous vehicle through the speed control and steering control for at least one of the first autonomous vehicle and the second autonomous vehicle. Additionally, the control server may be configured to decelerate the second autonomous vehicle when the bumpers of the first autonomous vehicle and the second autonomous vehicle are in contact with each other or when the docking of the first autonomous vehicle and the second autonomous vehicle has been completed, thereby completely braking the first autonomous vehicle. The control server may also be configured to operate remaining vehicles other than the selected second autonomous vehicle to not travel in a traveling lane of the first autonomous vehicle having the failed brake system.

According to another aspect of the present disclosure, a device for handling a brake failure of an autonomous vehicle may include a failure detector configured to detect a failure of a brake system, a communicator configured to transmit a rescue request signal to a control server when the failure is detected, and a controller configured to operate the autonomous vehicle to bring a bumper of the autonomous vehicle into contact with a bumper of a preceding autonomous vehicle or dock the autonomous vehicle with the preceding autonomous vehicle through speed control and steering control. The autonomous vehicle may be completely braked under deceleration control of the preceding autonomous vehicle when the bumper of the autonomous vehicle and the bumper of the preceding autonomous vehicle are in contact with each other or when the docking of the autonomous vehicle and the preceding autonomous vehicle has been completed.

In one exemplary embodiment, the brake system may include a primary brake system and a secondary brake system automatically driven when the primary brake system has failed. The failure detector may be configured to detect the failure of the primary brake system while traveling, and detect a failure of the secondary brake system when the failure of the primary brake system is detected. The failure detector may also be configured to determine that the brake system has failed when both the primary brake system and the secondary brake system have failed.

Additionally, the control server may be configured to obtain position information of the autonomous vehicle having the failed brake system based on the rescue request signal, and select the preceding autonomous vehicle based on the obtained position information. In one exemplary embodiment, the control server may be configured to operate remaining vehicles other than the selected preceding autonomous vehicle to not travel in a traveling lane of the autonomous vehicle having the failed brake system.

In one exemplary embodiment, the control server may be configured to perform the speed control and the steering control when an acceptance response to a rescue operation request transmitted to the selected preceding autonomous vehicle is received. The speed control and the steering control may be performed for at least one of the preceding autonomous vehicle and the autonomous vehicle having the failed brake system.

Further, traveling lanes of the preceding autonomous vehicle and the autonomous vehicle having the failed brake system may be matched with each other through the steering control, and then the speed control may be performed to bring a rear bumper of the preceding autonomous vehicle into contact with a front bumper of the autonomous vehicle having the failed brake system. The controller may be configured to transmit a rescue completion signal to the control server when identifying the complete brake.

The technical problems to be solved by the present inventive concept are not limited to the aforementioned problems, and any other technical problems not mentioned herein will be clearly understood from the following description by those skilled in the art to which the present disclosure pertains.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
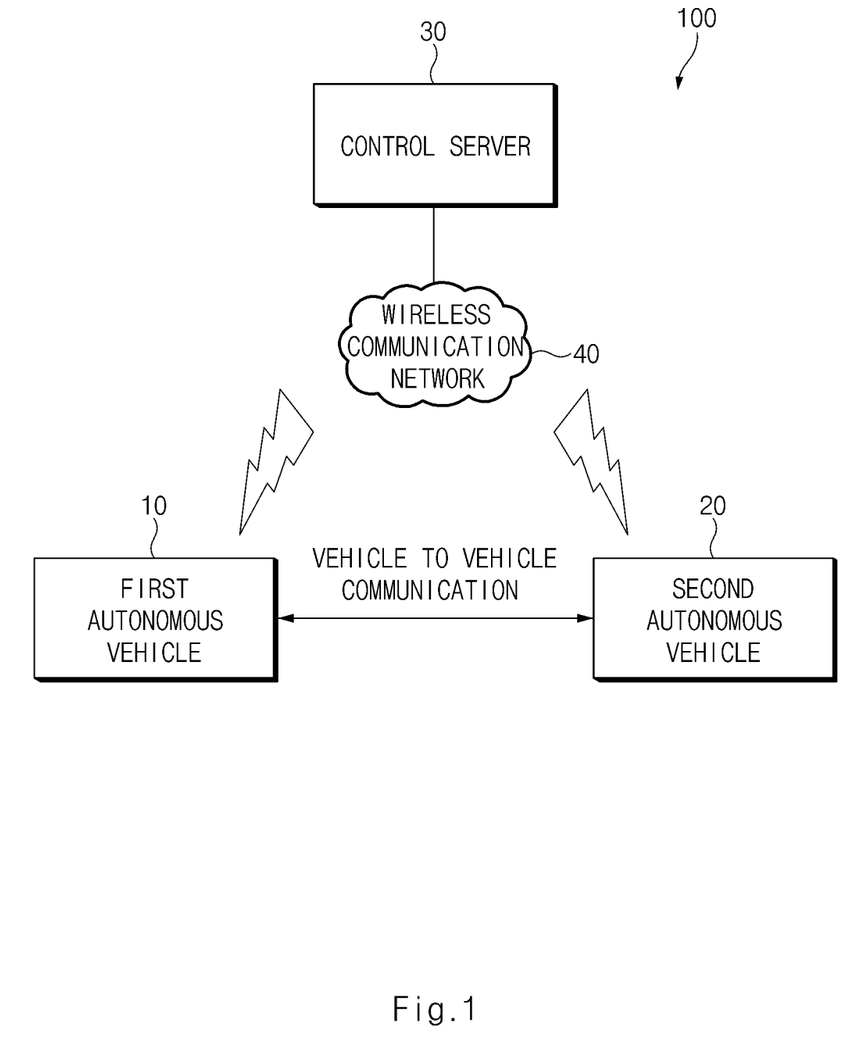
FIG. 1 is a view for describing a configuration of an autonomous vehicle brake failure handling system according to an exemplary embodiment of the present disclosure.

Hereinafter, exemplary embodiments of the present disclosure will be described in detail with reference to FIGS. 1 to 8. FIG. 1 is a view for describing a configuration of an autonomous vehicle brake failure handling system according to an exemplary embodiment of the present disclosure. For a convenience of a description below, the autonomous vehicle brake failure handling system will be referred to simply as a failure handling system.

Referring to FIG. 1, a failure handling system 100 may include a first autonomous vehicle 10, a second autonomous vehicle 20, a control server 30, and a wireless communication network 40. The first autonomous vehicle 10 and the second autonomous vehicle 20 may be configured to communicate with the control server 30 via the wireless communication network 40. The first autonomous vehicle 10 according to an exemplary embodiment may be configured to perform a communication with the second autonomous vehicle 20 via a vehicle to vehicle (V2V) communication.

For example, the vehicle to vehicle communication may be a vehicle-to-vehicle (V2V) communication defined by various standard organizations, such as an IEEE 802.11p, an IEEE 1609(WAVE), an ISO TC204(C-ITS), an ITU-R SG5 (V2X, Advanced ITS), a 3GPP SA 1 (Long Term Evolution (LTE) based V2X service), and the like, but may not be limited thereto.

The first autonomous vehicle 10 and the second autonomous vehicle 20 may include a brake system of a redundant structure. In this connection, a brake system of the redundant structure is a brake system having a redundancy, which may include a primary brake system and a secondary brake system, which is automatically switched over to and driven when the primary brake system has failed. For example, in response to determining that both the primary brake system and the secondary brake system have failed, the first autonomous vehicle 10 may be configured to transmit a rescue request message to the control server 30 via the wireless communication network 40.

The control server 30 may be configured to identify a current position of the first autonomous vehicle 10 in response to the rescue request message, and select the second autonomous vehicle 20 located within a particular radius or distance around the identified current position of the first autonomous vehicle as a rescue vehicle. In this connection, the second autonomous vehicle 20 may be a vehicle traveling along the same path as the first autonomous vehicle 10. The control server 30 may be configured to operate remaining vehicles adjacent to the first autonomous vehicle 10 except the second autonomous vehicle 20 selected as the rescue vehicle to not travel in a lane in which the first autonomous vehicle 10 is traveling. In other words, the control server 30 may be configured to output a notification or request to surrounding vehicles to travel in lanes other than the lane of the first autonomous vehicle 10 to thus prevent any potential collision risk.

Particularly, the control server 30 may be configured to obtain the position information by requesting the position information from the first autonomous vehicle 10. In this connection, the position information may include latitude and longitude information, traveling road information, traveling lane information, and the like, but may not be limited thereto. The control server 30 may be configured to transmit a rescue operation request signal to the second autonomous vehicle 20 via the wireless communication network 40.

The second autonomous vehicle 20 may be configured to transmit a rescue operation response signal that indicates an acceptance of the rescue request to the control server 30 via the wireless communication network 40. When the rescue request is accepted, the control server 30 may be configured to perform speed control and steering control for the first autonomous vehicle 10 and/or the second autonomous vehicle 20 based on the obtained position information.

In an exemplary embodiment, the control server 30 may be configured to perform the speed control and the steering control such that a front bumper of the first autonomous vehicle 10 and a rear bumper of the second autonomous vehicle 20 remain in contact. In another exemplary embodiment, as shown in a reference numeral 720 of FIG. 7 to be described later, the control server 30 may be configured to perform the speed control and the steering control such that the first autonomous vehicle 10 and the second autonomous vehicle 20 are docked with each other when the first autonomous vehicle 10 and the second autonomous vehicle 20 are respectively equipped with docking apparatuses.

In another exemplary embodiment, when the control server 30 provides the position information of the first autonomous vehicle 10 to the second autonomous vehicle 20, the second autonomous vehicle 20 may be configured to perform the speed control and the steering control via a vehicle to vehicle communication with the first autonomous vehicle 10 to maintain a bumper contact state or attempt to dock. When the bumper contact state or the docked state is stable, the control server 30 may be configured to operate the second autonomous vehicle 20 to perform deceleration control. When the first autonomous vehicle 10 and the second autonomous vehicle 20 are completely stopped in response to the deceleration control of the second autonomous vehicle 20, the first autonomous vehicle 10 and/or the second autonomous vehicle 20 may be configured to transmit a rescue completion signal to the control server 30 via the wireless communication network 40.

As described above, when the brake system (e.g., the primary and the secondary) of the autonomous vehicle has failed, through the control server 30 or through a direct linkage with another adjacent preceding autonomous vehicle, the brake failure handling system according to an exemplary embodiment of the present disclosure may allow the preceding autonomous vehicle to approach/come into contact with the failed autonomous vehicle and then may gradually decrease a vehicle speed to safely stop the failed autonomous vehicle, thereby preventing traffic accidents.

Figure 2:
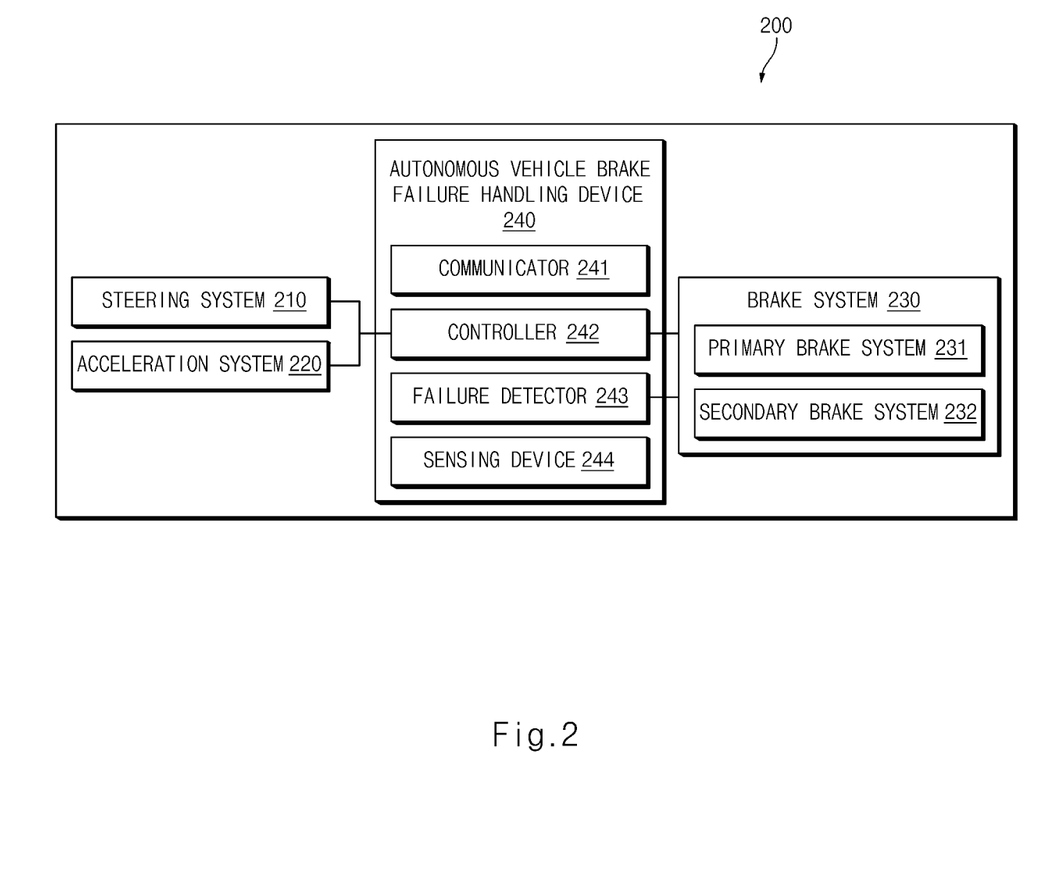
FIG. 2 is a view for describing a structure of an autonomous vehicle according to an exemplary embodiment of the present disclosure.

FIG. 2 is a view for describing a structure of an autonomous vehicle according to an exemplary embodiment of the present disclosure. Referring to FIG. 2, an autonomous vehicle 200 may include a steering system 210, an acceleration system 220, a brake system 230, and an autonomous vehicle brake failure handling device 240. For convenience of a description below, the autonomous vehicle brake failure handling device 240 will be referred to as simply as the failure handling device 240.

The brake system 230, which is a brake system having a redundant structure, may include a primary brake system 231 and a secondary brake system 232 that is automatically switched over to and driven when the primary brake system has failed. The failure handling device 240 may include a communicator 241, a controller 242, a failure detector 243, and a sensing device 244. The failure detector 243 may be configured to detect a failure of the brake system 230. For example, in response to detecting a failure of the primary brake system 231 while traveling (e.g., while the vehicle is being driven or is traveling along a path), the failure detector 243 may be configured to provide the detection result to the controller 242.

When the failure of the primary brake system 231 is detected, the controller 242 may be configured to operate or drive the secondary brake system 232. In response to detecting a failure of the secondary brake system 232 that is being driven, the failure detector 243 may be configured to determine that an entirety of the brake system 230 has failed, and provide the determination result to the controller 242.

The controller 242 may then be configured to transmit the rescue request message to the control server 30 through the communicator 241 when the entirety of the brake system 230 (e.g., the primary and secondary brake system) has failed. In this connection, the rescue request message may include at least one of a vehicle unique identifier for identifying the corresponding autonomous vehicle, current position information of the corresponding autonomous vehicle, failure detected time information, traveling speed information, traveling road information, traveling lane information, and information about whether the docking apparatus is installed, but may not be limited thereto.

The controller 242 may be configured to receive the rescue operation request message from the control server 30 through the communicator 241. The controller 242 may then be configured to transmit, through the communicator 241 to the control server 30, a rescue operation response message indicating that the requested rescue operation has been accepted when the rescue operation is available. The controller 242 may be configured to operate the steering system 210 and the acceleration system 220 based on a control signal of the control server 30 to adjust a traveling direction and speed of the autonomous vehicle 200.

When the autonomous vehicle 200 is selected as the rescue vehicle by the control server 30, the controller 242 may be configured to operate the steering system 210 to travel along the same lane as a traveling lane of a rescue target autonomous vehicle—an autonomous vehicle in which the brake system 230 has failed. For example, when the traveling lanes are matched with each other, the controller 242 may be configured to operate at least one of the acceleration system 220 and the brake system 230 such that the vehicle speed is decelerated in stages, and a front bumper of the rescue target autonomous vehicle and a rear bumper of the rescue vehicle are maintained in contact with each other. In another example, when the traveling lanes are matched with each other, the controller 242 may be configured to decelerate the vehicle speed in stages to dock the rescue target autonomous vehicle and the rescue vehicle with each other.

The sensing device 244 may be configured to collect sensing data from a sensor disposed in the autonomous vehicle 200 to detect whether the bumper is in contact and being docked. In addition, the sensing device 244 may be configured to detect whether the failed vehicle and the rescue vehicle are stably maintained in the bumper contact state or the docked state. As an example, the sensing device 244 may be linked with a camera, a radar sensor, a LIDAR sensor, an impact sensor, an imaging device, and the like. In response to detecting the failure of the brake system 230, the controller 242 may be configured to output, to a cluster (not shown), a predetermined warning alarm indicating that an emergency rescue request is being requested due to the failure of the brake system. When the primary brake system 231 of the brake system 230 has failed but the secondary brake system 232 is normal (e.g., no failure), the controller 242 may be configured to output, to the cluster (not shown), a predetermined warning alarm indicating that the brake system 230 requires repair.

Figure 3:
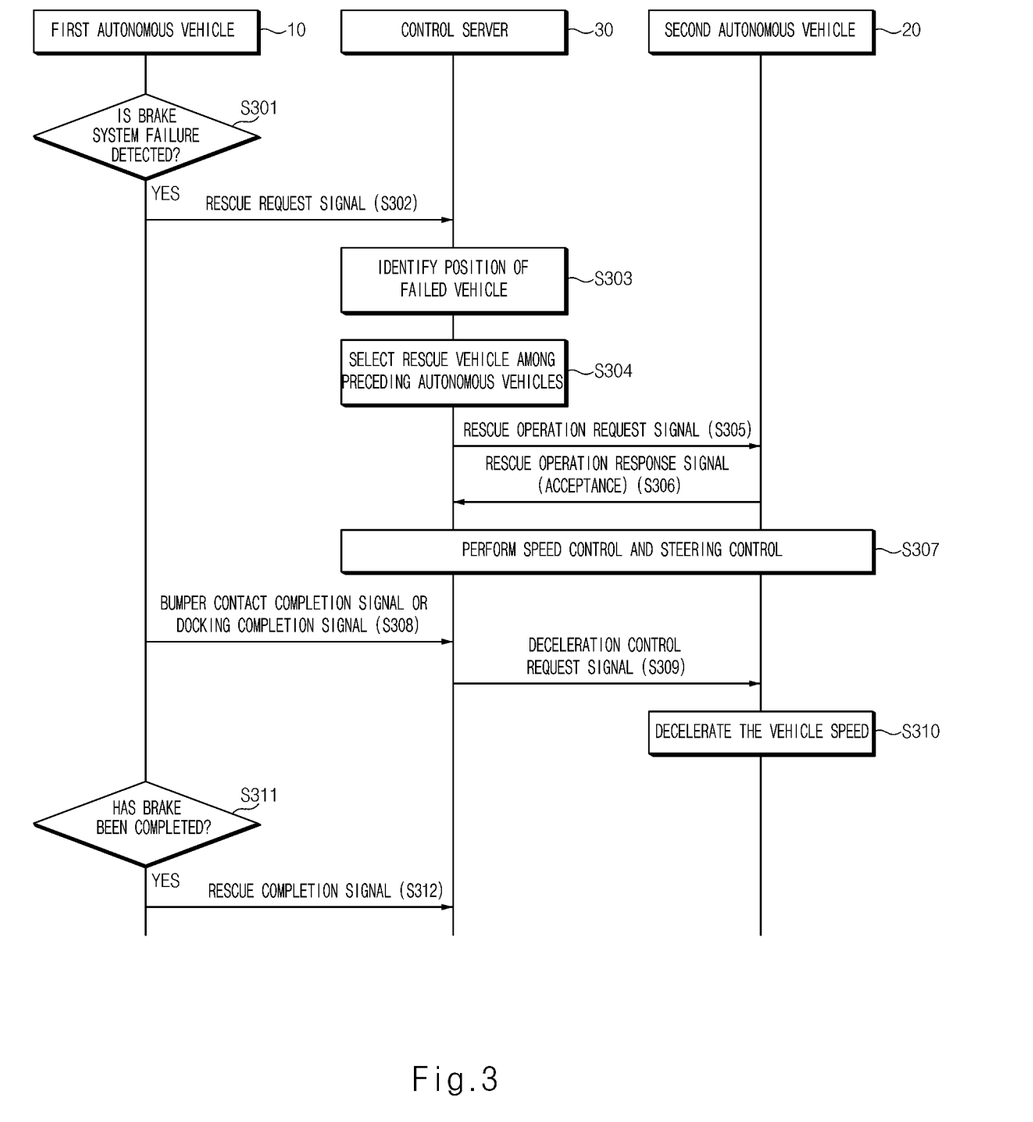
FIG. 3 is a flowchart illustrating an autonomous vehicle brake failure handling procedure according to an exemplary embodiment of the present disclosure.

FIG. 3 is a flowchart illustrating an autonomous vehicle brake failure handling procedure according to an exemplary embodiment of the present disclosure. Referring to FIG. 3, in response to detecting the brake system failure during traveling or operation, the first autonomous vehicle 10 may be configured to transmit the rescue request signal to the control server 30 via the wireless communication network 40 (S301 to S302).

The control server 30 may be configured to identify the position of the first autonomous vehicle 10 in which the brake system has failed (S303). In an exemplary embodiment, the first autonomous vehicle 10 may be configured to transmit the rescue request signal including the current position information thereof. In another exemplary embodiment, the control server 30 may be configured to collect real time position information from the first autonomous vehicle 10 through a separate control procedure. The control server 30 may be configured to identify preceding autonomous vehicles within a predetermined radius or distance around the current position of the first autonomous vehicle 10, and select the rescue vehicle among the identified preceding autonomous vehicles (S304).

In the present exemplary embodiment, it may be assumed that the second autonomous vehicle 20 is selected as the rescue vehicle. The control server 30 may be configured to transmit the rescue operation request signal to the second autonomous vehicle 20 via the wireless communication network 40 (S305). When the rescue operation is available, the second autonomous vehicle 20 may be configured to transmit the rescue operation response signal indicating the acceptance of the rescue operation request to the control server 30 (S306). In an exemplary embodiment, the rescue operation response signal may include information regarding whether the second autonomous vehicle 20 includes a docking device.

The control server 30 may be configured to perform the speed control and the steering control for the second autonomous vehicle 20 (S307). In the exemplary embodiment, the control server 30 may be configured to adjust traveling lanes of the first autonomous vehicle 10 and the second autonomous vehicle 20 to be matched with each other through the steering control (e.g., execute steering control of both vehicles such that the vehicles are traveling within the same driving lane), and then operate the first autonomous vehicle 10 to slowly approach a rear end of the second autonomous vehicle 20 through the speed control. When the contact state of the front bumper thereof and the rear bumper of the second autonomous vehicle 20, which is the rescue vehicle, is maintained stably, or when the docking has been completed normally, the first autonomous vehicle 10 may be configured to transmit a bumper contact completion signal or a docking completion signal to the control server 30 (S308).

The above exemplary embodiment describes that the first autonomous vehicle 10 transmits the bumper contact completion signal or the docking completion signal to the control server 30, however, this is merely one exemplary embodiment. Both the second autonomous vehicle 20 or the rescue vehicle (the second autonomous vehicle 20) and the rescue target vehicle (the first autonomous vehicle 10) may be configured to transmit the bumper contact completion signal or the docking completion signal to the control server 30.

When the bumper contact or the docking has been completed, the control server 30 may be configured to transmit a deceleration control request signal to the second autonomous vehicle 20 (S309). The second autonomous vehicle 20 may be configured to decelerate the vehicle speed in stages in response to the deceleration control request signal (S310). The first autonomous vehicle 10 and/or the second autonomous vehicle 20 may be configured to determine whether the brake (e.g., deceleration) has been completed (S311). When the vehicle is completely stopped as the determination result, the first autonomous vehicle 10 and/or the second autonomous vehicle 20 may be configured to transmit the rescue completion signal to the control server 30 (S312).

Figure 4:
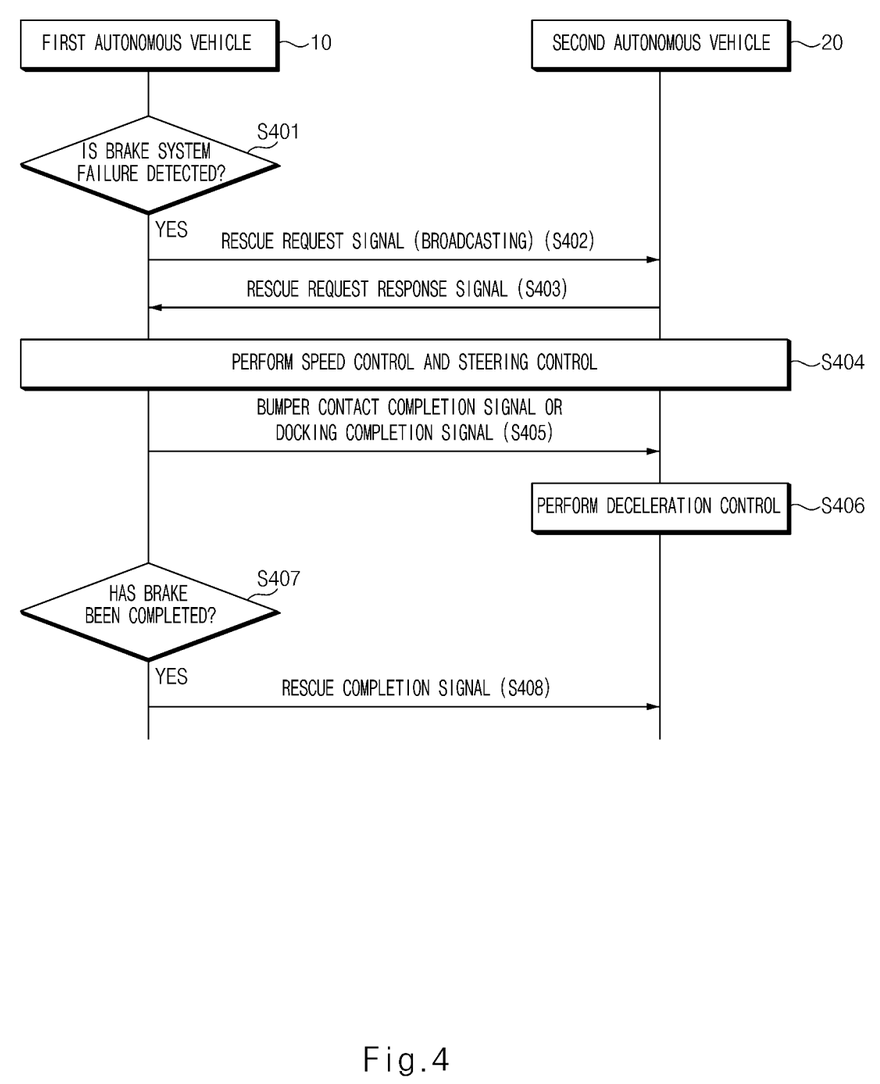
FIG. 4 is a flowchart illustrating an autonomous vehicle brake failure handling procedure according to another exemplary embodiment of the present disclosure.

FIG. 4 is a flowchart illustrating an autonomous vehicle brake failure handling procedure according to another exemplary embodiment of the present disclosure. Referring to FIG. 4, in response to detecting the brake system failure during the traveling, the first autonomous vehicle 10 may be configured to broadcast the rescue request signal within the particular radius through the vehicle to vehicle (V2V) communication (S401 to S402).

In an exemplary, the first autonomous vehicle 10 may be configured to transmit the rescue request signal including the current position information thereof. In another exemplary embodiment, the second autonomous vehicle 20 may be configured to collect the real time position information from the first autonomous vehicle 10 through the separate control procedure when the rescue request signal is received. The second autonomous vehicle 20, which is the vehicle capable of performing the rescue operation among the preceding autonomous vehicles adjacent or proximate to the first autonomous vehicle 10, may be configured to transmit the rescue request response signal to the first autonomous vehicle 10 via the vehicle to vehicle communication (S403). The second autonomous vehicle 20 may be configured to perform the speed control and the steering control (S404).

Additionally, the second autonomous vehicle 20 may be configured to match the traveling lanes of the first autonomous vehicle 10 and the second autonomous vehicle 20 using the steering control (e.g., execute steering control such that both vehicles are traveling within the same driving lane), and then operate the first autonomous vehicle 10 to slowly approach the rear end of the second autonomous vehicle 20 through the speed control. When the contact state of the front bumper thereof and the rear bumper of the second autonomous vehicle 20, which is the rescue vehicle, is maintained stably, or when the docking has been completed normally, the first autonomous vehicle 10 may be configured to transmit the bumper contact completion signal or the docking completion signal to the second autonomous vehicle 20 (S405).

The second autonomous vehicle 20 may be configured to decelerate the vehicle speed in stages based on the bumper contact completion signal or the docking completion signal (S406). The first autonomous vehicle 10 may be configured to determine whether the stopping has been completed (S407). When the vehicle is completely stopped as the determination result, the first autonomous vehicle 10 may be configured to transmit the rescue completion signal to the second autonomous vehicle 20 (S408).

Figure 5:
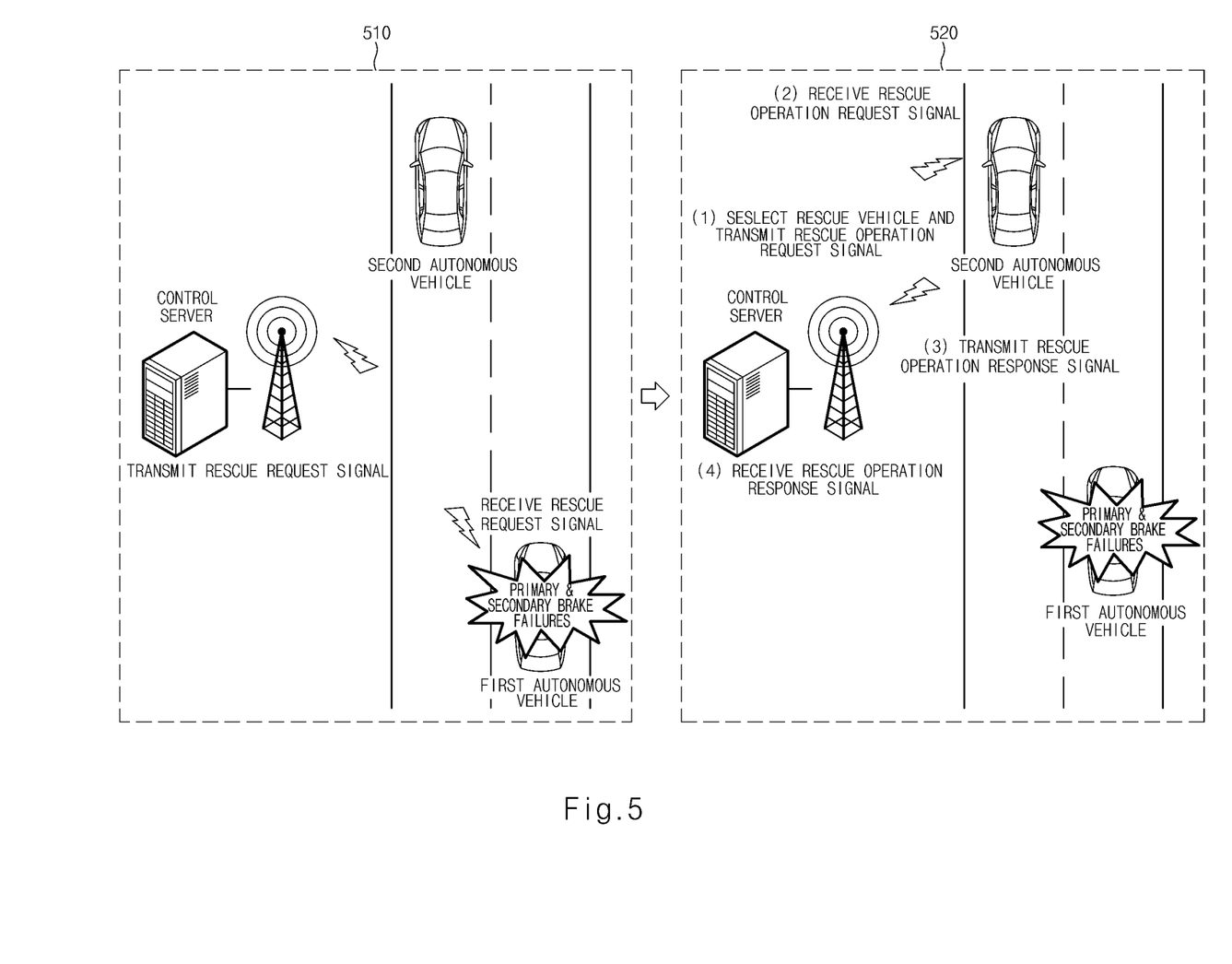
FIGS. 5 and 6 illustrate an autonomous vehicle brake failure handling procedure according to an exemplary embodiment of the present disclosure.
Figure 6:
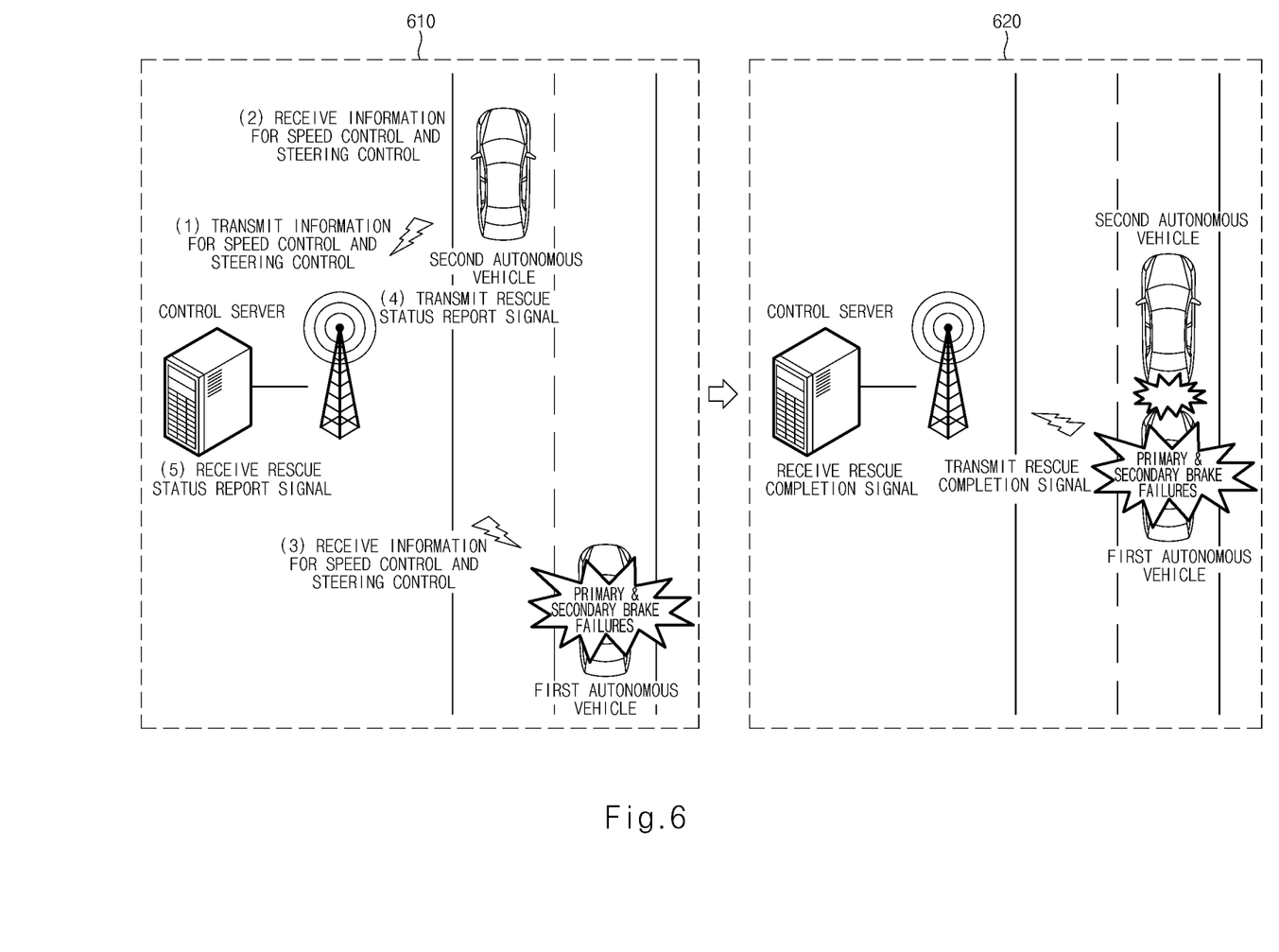

FIGS. 5 and 6 illustrate an autonomous vehicle brake failure handling procedure according to an exemplary embodiment of the present disclosure. Specifically, FIGS. 5 to 6 are views illustrating a process in which the first autonomous vehicle safely stops with the help of the second autonomous vehicle adjacent to and ahead of the first autonomous vehicle in a situation where the brake system of the traveling first autonomous vehicle has failed and stopping is impossible.

Referring to a reference numeral 510 of FIG. 5, when the brake is not available despite the switchover to the secondary brake system due to the detection of the failure of the primary brake system of the first autonomous vehicle, the failure handling device of the first autonomous vehicle may be configured to transmit the rescue request signals to the control server via the wireless communication network. In an exemplary embodiment, the rescue request signal may include the position information, the traveling speed information, the traveling road information, the traveling lane information, and the like of the first autonomous vehicle, but is not limited thereto.

Referring to a reference numeral 520 of FIG. 5, the control server may be configured to select the rescue vehicle based on the current position of the first autonomous vehicle, and transmit the rescue operation request signal to the selected rescue vehicle (e.g., the second autonomous vehicle) via the wireless communication network. When the rescue operation is available, the second autonomous vehicle may be configured to generate the rescue operation request response signal and transmit the rescue operation request response signal to the control server.

In addition, the control server may be configured to select a preceding traveling vehicle nearest to the current position of the first autonomous vehicle as the rescue vehicle. The second autonomous vehicle having received the rescue operation request signal may slowly move toward the first autonomous vehicle through the speed and steering control. The first autonomous vehicle may also be configured to receive the traveling information of the second autonomous vehicle from the control server, and operate the steering system thereof to approach the second autonomous vehicle based on the received traveling information. In particular, the control server may be configured to determine a lane with the least traffic volume or the safest lane as a rescue lane in consideration of a traffic condition and the like for each lane, and provide information regarding the determined rescue lane to the first autonomous vehicle and the second autonomous vehicle.

Referring to a reference numeral 610 of FIG. 6, the second autonomous vehicle may be configured to perform the steering control to be close to the first autonomous vehicle (e.g., to approach the first autonomous vehicle) while transmitting a rescue status report signal for reporting a progress of the rescue operation to the control server. In this connection, the second autonomous vehicle may be configured to perform the steering control to travel along the same lane as the first autonomous vehicle. The control server may be configured to instruct all vehicles except the second autonomous vehicle not to travel in the corresponding lane such that no other vehicle travels ahead of the first autonomous vehicle in the traveling lane during the steering control thus preventing potential vehicle collisions.

Referring to a reference numeral 620 of FIG. 6, the second autonomous vehicle may be configured to adjust the vehicle speed and steering such that the rear bumper thereof is brought into contact with the front bumper of the first autonomous vehicle. At this time, the second autonomous vehicle may not sharply reduce the speed after the bumper contact, and instead may be configured to perform fine deceleration control and steering control to keep the first autonomous vehicle and the bumper contact state safe.

The second autonomous vehicle may be configured to adjust the steering and the brake system to slowly reduce the vehicle speed to reach a stopped state. The first autonomous vehicle and/or the second autonomous vehicle may be configured to transmit the rescue completion signal to the control server when the complete stop state is identified.

Figure 7:
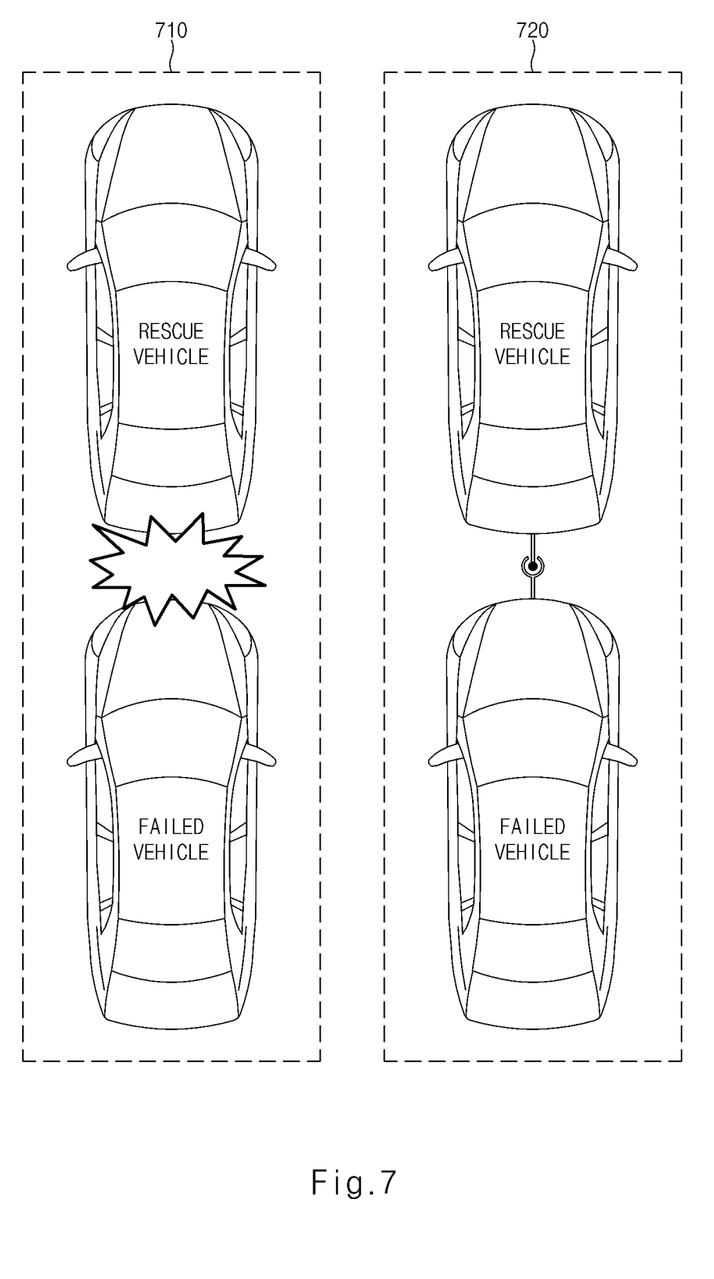
FIG. 7 is a diagram for describing a method for bring a failed vehicle into contact with a rescue vehicle according to an exemplary embodiment of the present disclosure.

FIG. 7 is a diagram for describing a method for bring a failed vehicle into contact with a rescue vehicle according to an exemplary embodiment of the present disclosure. Referring to a reference numeral 710 of FIG. 7, the rescue vehicle may be configured to perform the deceleration control when the rear bumper of the rescue vehicle and the front bumper of the failed vehicle are in contact with each other, thereby safely stopping the failed vehicle, which is traveling. Referring to a reference numeral 720 of FIG. 7, when the rescue vehicle and the failed vehicle are respectively equipped with the docking apparatus, the rescue vehicle may be configured to perform the deceleration control to safely stop the traveling failed vehicle when the rescue vehicle and the failed vehicle are docked with each other.

Figure 8:
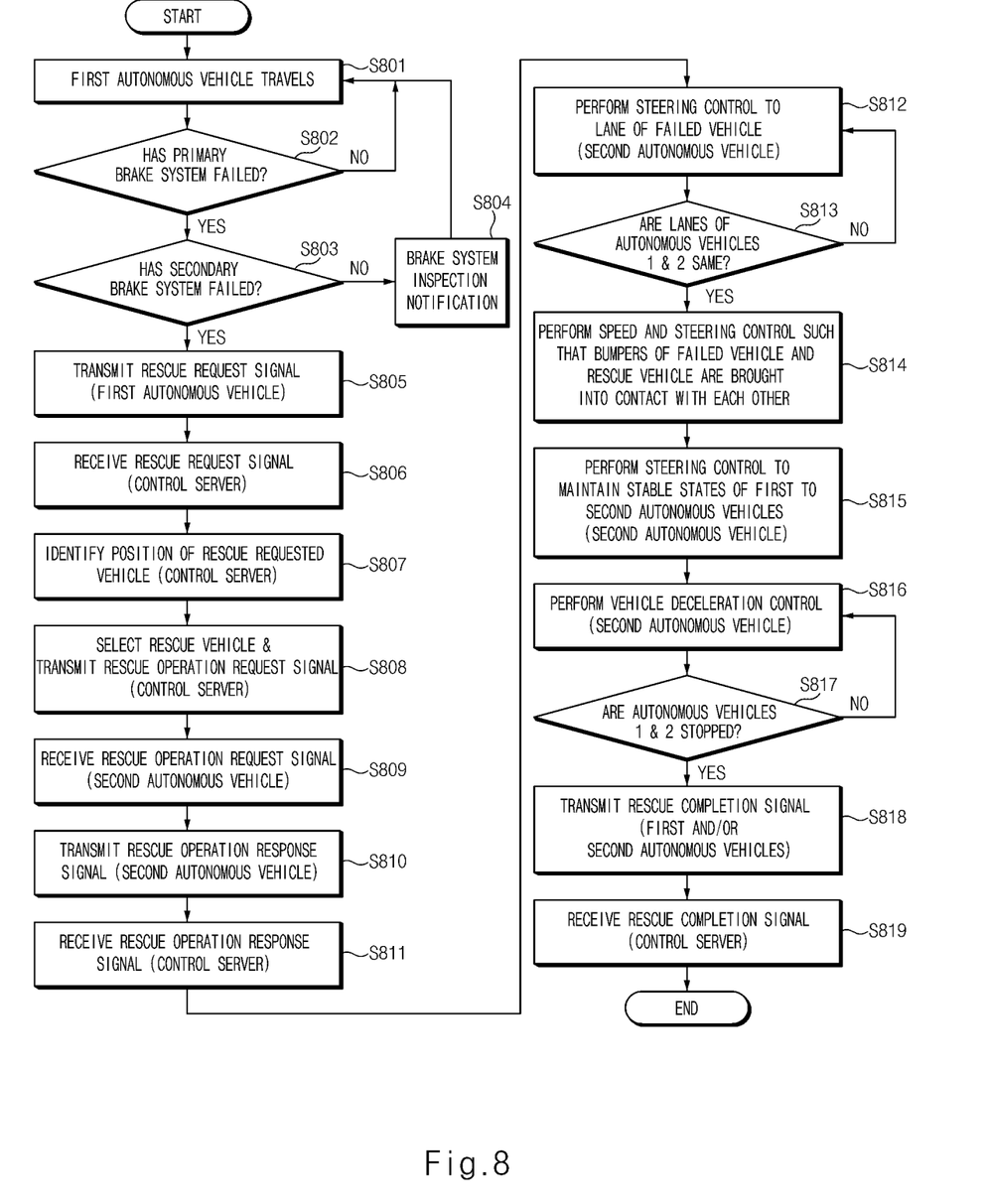
FIG. 8 is a flowchart for describing an autonomous vehicle brake failure handling method according to an exemplary embodiment of the present disclosure.

FIG. 8 is a flowchart for describing an autonomous vehicle brake failure handling method according to an exemplary embodiment of the present disclosure. Referring to FIG. 8, the first autonomous vehicle 10 may be configured to determine whether the primary brake system has failed during the traveling (S801 to S802). In response to determining that the primary brake system has failed, the first autonomous vehicle 10 may be switched over to the secondary brake system and may be configured to determine whether the secondary brake system has failed (S803). In response to determining that the secondary brake system is normal (e.g., operating without malfunction, error, or failure), the first autonomous vehicle 10 may be configured to output a brake system inspection notification to the cluster (e.g. providing a notification to a driver) and continue traveling (S804).

In response to determining that the secondary brake system has also failed, the first autonomous vehicle 10 may be configured to transmit the rescue request signal to the control server 30 via the wireless communication network 40 (S805). The control server 30 may be configured to receive the rescue request signal (S806). The control server 30 may be configured to identify a position of a rescue requested vehicle—the failed vehicle (S807). The control server 30 may then be configured to select the rescue vehicle—the second autonomous vehicle 20 that is able to rescue the corresponding failed vehicle based on the identified position, and transmit the rescue operation request signal to the selected rescue vehicle (S808).

In response to receiving the rescue operation request signal, the second autonomous vehicle 20 may be configured to determine whether the rescue operation is possible, and transmit the rescue operation response signal to the control server 30 in response to determining the rescue operation is possible (S809 to S810). The second autonomous vehicle 20 may be configured to move to the lane in which the first autonomous vehicle 10, which is the failed vehicle, is traveling through the steering control (S812 to S813). The second autonomous vehicle 20 may be configured to perform the speed and steering control such that the rear bumper thereof is brought into contact with the front bumper of the first autonomous vehicle 10 (S814).

Further, the second autonomous vehicle 20 may be configured to perform the fine steering control to maintain the bumper contact state stable (S815). The second autonomous vehicle 20 may be configured to operate the brake system in a state in which the bumper contact is stabilized to gradually reduce the vehicle speed (S816). When the second autonomous vehicle 20 and the first autonomous vehicle 10 are completely stopped, the second autonomous vehicle 20 and/or the first autonomous vehicle 10 may be configured to transmit the rescue completion signal to the control server 30 (S817 to S818). In response to receiving the rescue completion signal, the control server 30 may be configured to complete the rescue operation for the vehicle in which the brake system has failed (S819).

The operations of the method or the algorithm described in connection with the exemplary embodiments disclosed herein may be embodied directly in a hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium is coupled to the processor, which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the exemplary embodiments of the present disclosure are provided to explain the spirit and scope of the present disclosure, but not to limit them, so that the spirit and scope of the present disclosure is not limited by the exemplary embodiments. The scope of the present disclosure should be construed on the basis of the accompanying claims, and all the technical ideas within the scope equivalent to the claims should be included in the scope of the present disclosure.

The present disclosure provides a method for handling the brake failure of the autonomous vehicle, and the device and the system therefor. Further, the present disclosure provides a method for handling the brake failure of the autonomous vehicle, and the device and the system therefor that may perform the cooperative control with the adjacent autonomous vehicle through the control server when the failure of the autonomous vehicle brake system is detected, thereby safely stopping the failed autonomous vehicle.

Additionally, the present disclosure provides a method for handling the brake failure of the autonomous vehicle, and the device and the system therefor in which the autonomous vehicle with all of the redundant braking systems that have failed may be completely stopped by the adjacent preceding autonomous vehicle to which the autonomous vehicle is communicatively connected. Further, the present disclosure may expect an effect of minimizing a human/material damage by preventing a vehicle collision accident due to the failure of the brake system of the autonomous vehicle. In addition, various effects, directly or indirectly understood through the present specification, may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for handling a brake failure of an autonomous vehicle, comprising:
   detecting a failure of a brake system of the autonomous vehicle;
   transmitting a rescue request signal to a control server in response to detecting the failure; and
   operating the autonomous vehicle to move a bumper of the autonomous vehicle into contact with a bumper of a preceding autonomous vehicle or docking the autonomous vehicle with the preceding autonomous vehicle through speed control and steering control executed by the control server,
   wherein the autonomous vehicle having the failure-detected brake system is completely stopped under a deceleration control of the preceding autonomous vehicle when the bumpers of the autonomous vehicle and the preceding autonomous vehicle are in contact with each other or when the docking of the autonomous vehicle and the preceding autonomous vehicle has been completed.

2. The method of claim 1, wherein the brake system includes a primary brake system and a secondary brake system automatically driven when the primary brake system has failed.

3. The method of claim 2, wherein the detecting of the failure of the brake system includes:
   detecting a failure of the primary brake system while traveling; and
   detecting a failure of the secondary brake system in response to detecting the failure of the primary brake system,
   wherein the failure of the brake system is detected when both the primary brake system and the secondary brake system have failed.

4. The method of claim 1, wherein the control server is configured to:
   obtain position information of the autonomous vehicle having the failed brake system based on the rescue request signal; and
   select the preceding autonomous vehicle based on the obtained position information.

5. The method of claim 4, wherein the control server is configured to operate surrounding vehicles other than the selected preceding autonomous vehicle to not travel in a traveling lane of the autonomous vehicle having the failed brake system.

6. The method of claim 4, wherein the control server is configured to perform the speed control and the steering control in response to receiving an acceptance response to a rescue operation request transmitted to the selected preceding autonomous vehicle.

7. The method of claim 6, wherein the speed control and the steering control are performed for at least one of the preceding autonomous vehicle and the autonomous vehicle having the failed brake system.

8. The method of claim 7, wherein traveling lanes of the preceding autonomous vehicle and the autonomous vehicle having the failed brake system are matched with each other through the steering control, and the speed control is performed to bring a rear bumper of the preceding autonomous vehicle into contact with a front bumper of the autonomous vehicle having the failed brake system.

9. The method of claim 1, further comprising:
   transmitting a rescue completion signal to the control server in response to identifying the complete stop.

10. A brake failure handling system for an autonomous vehicle, comprising:
    a first autonomous vehicle configured to transmit a rescue request signal in response to detecting a failure of a brake system thereof while traveling; and
    a control server configured to select and operate a second autonomous vehicle for completely braking the autonomous vehicle based on the rescue request signal,
    wherein the control server is configured to:
       operate the first autonomous vehicle to move a bumper of the first autonomous vehicle into contact with a bumper of the second autonomous vehicle or docking the first autonomous vehicle with the second autonomous vehicle through speed control and steering control for at least one of the first autonomous vehicle and the second autonomous vehicle; and
       perform deceleration control of the second autonomous vehicle when the bumpers of the first autonomous vehicle and the second autonomous vehicle are in contact with each other or when the docking of the first autonomous vehicle and the second autonomous vehicle has been completed, thereby completely braking the first autonomous vehicle.

11. The brake failure handling system for an autonomous vehicle of claim 10, wherein the control server is configured to operate surrounding vehicles other than the selected second autonomous vehicle to not travel in a traveling lane of the first autonomous vehicle having the failed brake system.

12. A device for handling a brake failure of an autonomous vehicle, comprising:
 a failure detector configured to detect a failure of a brake system of the autonomous vehicle;
 a communicator configured to transmit a rescue request signal to a control server in response to the failure being detected; and
 a controller configured to operate the autonomous vehicle to move a bumper of the autonomous vehicle into contact with a bumper of a preceding autonomous vehicle or dock the autonomous vehicle with the preceding autonomous vehicle through speed control and steering control under control of the control server,
 wherein the autonomous vehicle is completely braked under deceleration control of the preceding autonomous vehicle when the bumper of the autonomous vehicle and the bumper of the preceding autonomous vehicle are in contact with each other or when the docking of the autonomous vehicle and the preceding autonomous vehicle has been completed.

13. The device of claim 12, wherein the brake system includes a primary brake system and a secondary brake system automatically driven when the primary brake system has failed.

14. The device of claim 13, wherein the failure detector is configured to:
 detect the failure of the primary brake system while traveling;
 detect a failure of the secondary brake system in response to detecting the failure of the primary brake system; and
 determine that the brake system has failed when both the primary brake system and the secondary brake system have failed.

15. The device of claim 12, wherein the control server is configured to:
 obtain position information of the autonomous vehicle having the failed brake system based on the rescue request signal; and
 select the preceding autonomous vehicle based on the obtained position information.

16. The device of claim 15, wherein the control server is configured to operate surrounding vehicles other than the selected preceding autonomous vehicle to not travel in a traveling lane of the autonomous vehicle having the failed brake system.

17. The device of claim 15, wherein the control server is configured to perform the speed control and the steering control in response to receiving an acceptance response to a rescue operation request transmitted to the selected preceding autonomous vehicle.

18. The device of claim 17, wherein the speed control and the steering control are performed for at least one of the preceding autonomous vehicle and the autonomous vehicle having the failed brake system.

19. The device of claim 18, wherein traveling lanes of the preceding autonomous vehicle and the autonomous vehicle having the failed brake system are matched with each other through the steering control, and the speed control is performed to move a rear bumper of the preceding autonomous vehicle into contact with a front bumper of the autonomous vehicle having the failed brake system.

20. The device of claim 12, wherein the controller is configured to transmit a rescue completion signal to the control server in response to identifying the complete brake.

* * * * *